Sept. 17, 1940.  J. ZUCKERMAN  2,214,949
BEET HARVESTER
Filed March 2, 1940  2 Sheets-Sheet 2
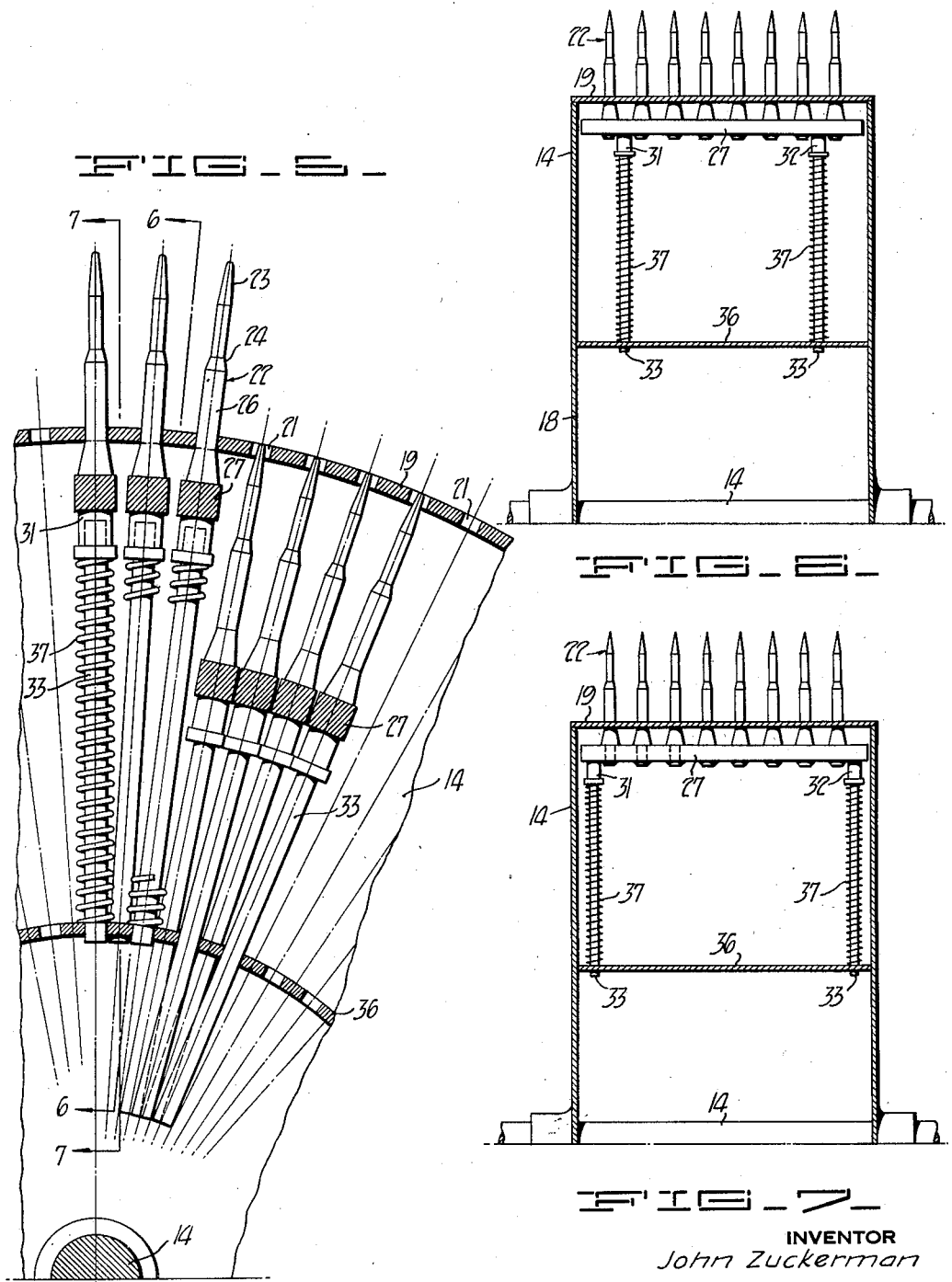
INVENTOR
John Zuckerman
BY
ATTORNEY Patented Sept. 17, 1940

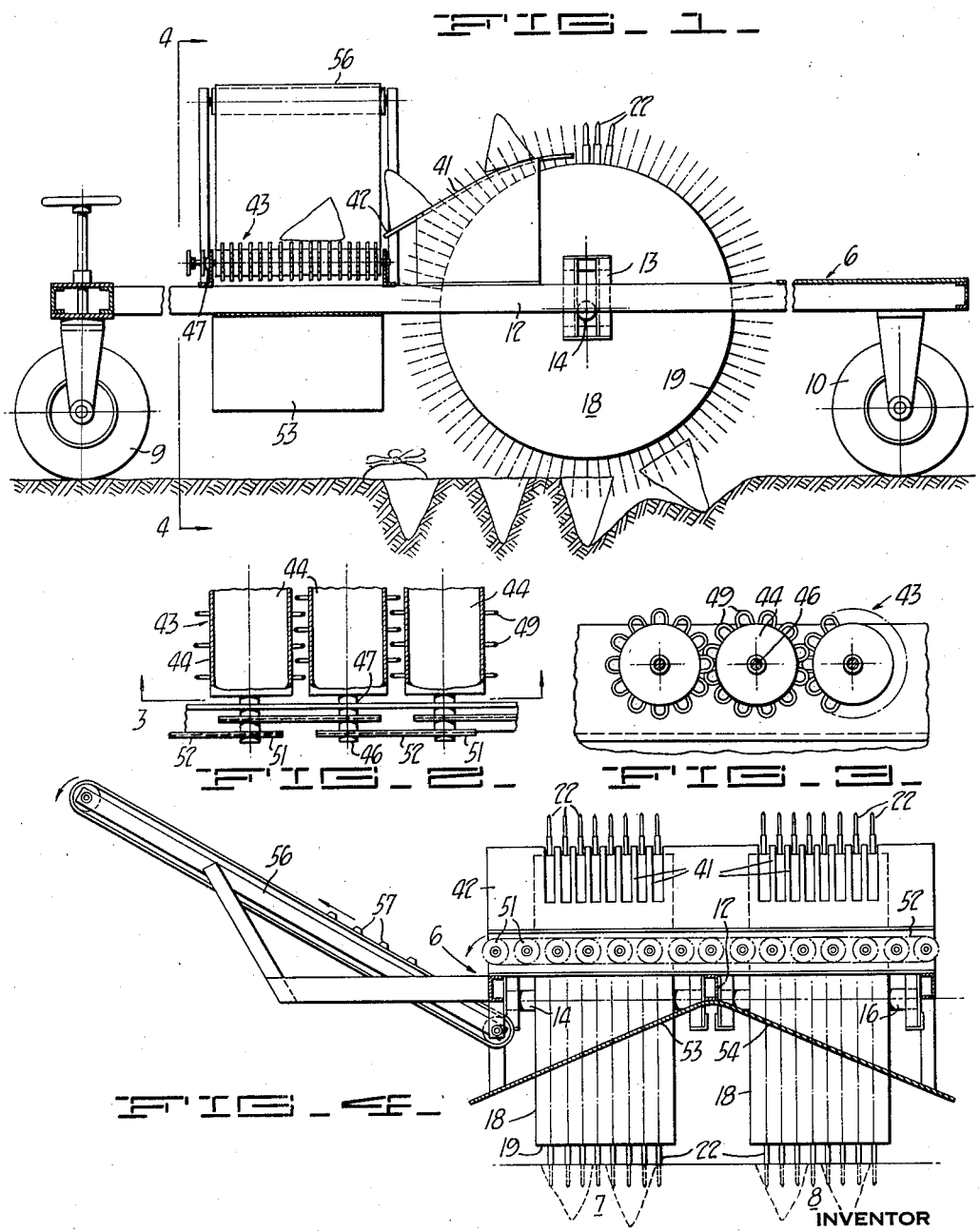

2,214,949

UNITED STATES PATENT OFFICE 2,214,949

BEET HARVESTER

John Zuckerman, Stockton, Calif.

Application March 2, 1940, Serial No. 321,871

6 Claims. (Cl. 55—108)

My invention relates to beet harvesters for use in a field of growing beets which have been deprived of their crowns or leafy portions, and is for the purpose of removing such beets from and separating them from the soil in which they have grown. A device of this general character is disclosed in my copending application Serial No. 263,054, filed March 20, 1939.

In the successful harvesting of beets from their growing environment, it is necessary not only to remove the beets from their growing position in the soil but also to separate them from principal portions of adhering soil or comparable material, and also to provide a structure in which the mechanism is not damaged by rocks or exceedingly hard clods or other relatively foreign material which may in many instances be present in the soil. It is often desirable to have a mechanism of this character which can operate upon a row crop, such as beets, in such a fashion that the harvesting of the crop in one or more rows does not increase the difficulty of harvesting in adjacent rows.

It is therefore an object of my invention to provide a beet harvester which is in general an improvement upon beet harvesters now available.

Another object of my invention is to provide a beet harvester which is effective to remove topped beets from their growing environment.

Another object of my invention is to provide a beet harvester which is effective virtually completely to separate the harvested beets from the associated soil.

An additional object of the invention is to provide a beet harvester which is effective upon one or more rows of the crop being harvested without deleteriously affecting adjacent rows.

The foregoing and other objects are attained in the embodiment of the invention illustrated in the drawings, in which Fig. 1 is a side elevation of a beet harvester constructed in accordance with my invention;

Fig. 2 is a detail plan of a portion of the separator part of the mechanism, partially in cross-section;

Fig. 3 is a cross-section the plane of which is indicated by the line 3—3 of Fig. 2;

Fig. 4 is a cross-section the plane of which is indicated by the line 4—4 of Fig. 1;

Fig. 5 is a detail view, to an enlarged scale, of a portion of the rotary drum and spike structure of my beet harvester, most of the figure being in cross-section;

Fig. 6 is a partial cross-section the plane of which is indicated by the line 6—6 of Fig. 5; and Fig. 7 is a partial cross-section the plane of which is indicated by the line 7—7 of Fig. 5.

In its preferred form, the beet harvester of my invention includes a frame movably supported on the ground and adapted to be drawn and having rotatably mounted thereupon a drum from which spikes project peripherally, being yieldably urged radially outward for contact with beets, and at a following cycle coming into relationship with a stripping means for depositing impaled material upon a separating screen from whence the beets are conveyed away and the separated material is returned to the ground.

While the beet harvester of my invention can readily be embodied in a number of different forms, it is conveniently embodied as shown in the accompanying drawings, in which there is disclosed a frame 6, conveniently fabricated of structural shapes and being generally of a rectangular plan of sufficient width to span a plurality of pairs of rows 7 and 8 of material to be harvested, for example beets. The frame 6 is supported upon the ground by ground-engaging wheels 9 and 10 which can be of any preferred type to facilitate the propulsion of the frame over the ground in the direction of the rows 7 and 8.

Preferably, the frame 6 is provided with a center member 12 serving as one of the supports for a plurality of bearings 13 within which are loosely but rotatably mounted a separate pair of axles 14 and 16 which are substantially identical and but one of which therefore need be described. The axle 14, for example, serves as the support for a drum 18 which has a circular-cylindrical periphery 19 pierced by a plurality of apertures 21 at even circumferential spacings but at staggered axial spacings therearound. Adapted to project through each one of the apertures is a beet-impaling spike 22 which has a reduced point portion 23 merging with a shoulder 24 which in turn merges with a body 26 inserted within and welded to a cross-bar 27. Preferably, eight such spikes 22 are mounted on a single cross-bar 27 which extends substantially entirely across the interior of the drum 18. In order appropriately to constrain the bar 27 to the desired path of movement, which is radial with respect to the drum, I provide on each of the bars 27 a pair of sockets 31 and 32, alternate bars having their sockets staggered, as clearly shown in Figs. 6 and 7, so as to avoid any mechanical interference. Seated in each of the sockets 31 and 32 are rods 33 which also pass through apertures piercing a central band 36 concentrically disposed within the drum 18 and serving as a guide for the rods.

In order yieldably to urge the spikes outwardly, yet to permit them to retract within the drum when unduly hard or other deleterious material is encountered, I surround each of the rods 33 with a coil spring 37 interposed between the inner band 36 and the respective sockets 31 and 32 on the associated bar 27.

In the operation of the structure, as the drum 18 revolves due to the advancement of the vehicle, the projecting spikes 22 encounter and impale the topped beets remaining in the ground, impaling them to the depth of the shoulder 24, which is effective to limit such movement. Upon further rotation of the wheel, the beets are dislodged from the ground and are lifted. In the event the spikes encounter rocks, stumps or other hard material, they are not damaged but simply retract within the drum 18. In addition to picking up some beets, however, the closely spaced spikes 22 are often effective to carry upwardly with them, usually between a group of four spikes, a number of clods or small rocks or comparable debris.

As the drum 18 continues to revolve, and when it attains its uppermost position, the spaces between the spikes are occupied by strippers 41 which comprise fingers extending from a support plate 42 mounted on the frame 6 and are effective to engage any impaled material upon the spikes and likewise to engage and dislodge from between such spikes any clods or rocks which may have been carried around to such point. As the drum 18 continues to revolve toward its initial position, the spikes are all stripped clean of any impaled or adhering material and are ready to repeat the impaling operation.

The stripped beets and other material pass gravitally down the supporting plate 42 to a separating screen 43. This screen is comprised of a plurality of rollers 44 all of which are identical and but one of which, therefore, is described. This roller is mounted upon an axle 46 carried in bearings 47 on the frame 6 and is provided all around and along its periphery with a plurality of U-shaped wire loops 49, the loops on adjacent rollers being interspersed; but since the loops are continuous and without projecting ends, they are ineffective to effect any impaling operation.

All of the rollers 44 of the screen 43 are simultaneously rotated in the same direction by means of various sprockets 51 and connecting chains 52 connected to any suitable source of power, such as an engine or one of the ground wheels 10 (not shown). The effect of the screen 43 is to transfer the superimposed beets laterally of the frame 6 toward one side of the machine, but to separate therefrom and to permit to fall therethrough any miscellaneous debris such as clods, twigs and the like, which pass below the screen and fall upon a pair of inclined plates 53 and 54, directing such discarded material to either side of the rows 7 and 8 and off the beets immediately ahead of the machine which are subsequently to be gathered. At one end of the screen there is provided an endless belt conveyor 56 mounted on the framework 6 and suitably propelled to carry beets discharged from the screen 43 upwardly and outwardly of the machine to any suitable receptacle such as a vehicle driven alongside (not shown). The conveyor 56 itself can be comprised of a plurality of slats 57 connected to suitable driving means, so that any material which might possibly not have been separated on the screen 43, but which will pass through the interstices between the slats 57, will at that point be returned to the ground.

I claim:

1. A beet harvester comprising a frame, a drum rotatably mounted upon said frame and having a plurality of apertures in the periphery thereof, a plurality of spikes passing through said apertures, a bar within said drum engaging said spikes, guides constraining said bar to movement radially of said drum, and springs urging said bar outwardly of said drum.

2. A beet harvester comprising a frame, a spike-studded drum mounted on said frame to impale beets and engage clods, means for removing said beets and clods from said drum, a screen for assisting in the gravital separation of said beets and said clods, the interstices of said screen being smaller than said beets and the distance between said spikes being less than the corresponding dimension of said interstices, and means for diverting clods passing through said screen laterally of said frame.

3. A beet harvester comprising a frame, a drum mounted on said frame and having apertures in the periphery thereof, and radially yieldable spikes projecting through said apertures, the projecting portion of said spikes being reduced in diameter to afford a shoulder to limit the beet-piercing movement of said spikes.

4. A beet harvester comprising a frame, a drum rotatably mounted upon said frame, said drum having peripheral apertures therein, a concentric band within said drum and rotatable therewith, said band having apertures therein, a plurality of spikes projecting through said apertures in said drum, a bar joining said spikes, a guide extending from said bar through an aperture in said band, and a spring interposed between said bar and said band for urging said spikes outwardly of said drum.

5. A beet harvester comprising a rotatable drum, a band within said drum, a transverse series of spikes projecting from within said drum, means joining all of the spikes of said series, a guide engaging said bar and said band, and a spring interposed between said bar and said band and encompassing said guide.

6. A beet harvester comprising a frame extending in the direction of a row of beets, a drum rotatably mounted on said frame to roll upon said row of beets, spikes projecting from said drum to impale beets in said row and to engage clods, a screen upon said frame, means for depositing said beets and said clods upon said screen, means for conveying beets away from said screen, and means for deflecting laterally of said frame clods passing through said screen.

JOHN ZUCKERMAN.